(12) United States Patent
 Ashby (10) Patent No.: US 11,315,207 B1
(45) Date of Patent: Apr. 26, 2022

(54) CARGO OPTIMIZATION SYSTEMS, DEVICES AND RELATED METHODS

(71) Applicant: Des Moines Area Metropolitan Planning Organization, Des Moines, IA (US)

(72) Inventor: Todd Ashby, Ankeny, IA (US)

(*) Notice: Subject to any disclaimer, the term of this patent is extended or adjusted under 35 U.S.C. 154(b) by 80 days.

(21) Appl. No.: 15/997,303

(22) Filed: Jun. 4, 2018

Related U.S. Application Data (60) Provisional application No. 62/514,338, filed on Jun. 2, 2017.

(51) Int. Cl.
 *G06Q 50/28* (2012.01)
 *G06F 16/22* (2019.01)
 *G06Q 10/06* (2012.01)

(52) U.S. Cl.
 CPC ......... *G06Q 50/28* (2013.01); *G06F 16/2291* (2019.01); *G06Q 10/06315* (2013.01)

(58) Field of Classification Search
 None
 See application file for complete search history.

(56) References Cited

U.S. PATENT DOCUMENTS

| | | | | |
|---|---|---|---|---|
| 4,465,413 A * | 8/1984 | Petren | ................ | B60P 7/0892 410/94 |
| 5,880,958 A * | 3/1999 | Helms | ................ | G08G 1/202 701/117 |
| 6,463,419 B1 * | 10/2002 | Kluss | ................ | G06Q 10/08 705/330 |
| 7,155,406 B2 * | 12/2006 | Kang | ................ | G06Q 10/08 705/28 |
| 8,756,119 B1 * | 6/2014 | Andrews | ................ | G06Q 30/06 705/1.1 |
| 2002/0049622 A1 * | 4/2002 | Lettich | ................ | G06Q 10/063 705/7.11 |
| 2005/0209869 A1 * | 9/2005 | Irvin | ................ | G06Q 10/08 705/39 |
| 2010/0208070 A2 * | 8/2010 | Haynes | ................ | G07C 5/085 348/148 |
| 2012/0216875 A1 * | 8/2012 | Szydlowski | ................ | E03B 3/30 137/2 |
| 2013/0246298 A1 * | 9/2013 | Higham | ................ | G06Q 10/083 705/335 |
| 2014/0039964 A1 * | 2/2014 | Sengupta | ................ | G06Q 10/08 705/7.25 |
| 2015/0213402 A1 * | 7/2015 | Stroner | ................ | G06Q 10/0835 705/40 |
| 2015/0278925 A1 * | 10/2015 | Chaiyawantakee | ................ | G06Q 30/0635 705/26.81 |
| 2016/0335593 A1 * | 11/2016 | Clarke | ................ | G06Q 10/0833 |
| 2017/0178073 A1 * | 6/2017 | Yao | ................ | G06Q 10/08355 |
| 2020/0126036 A1 * | 4/2020 | Chou | ................ | G06Q 10/047 |

* cited by examiner

*Primary Examiner* — Sujay Koneru
(74) *Attorney, Agent, or Firm* — Matthew Warner-Blankenship; Dentons Davis Brown, P.C.

(57) ABSTRACT

A shipping container optimization and utilization system and method for identifying and utilizing otherwise unused, deadheading shipping containers. The systems and methods aggregate, compile, and index cargo capacity data into a searchable database so that users can identify and pair loads with unused shipping containers. The systems and methods improve efficiency in transportation and shipping routes.

9 Claims, 8 Drawing Sheets

Basic Search

Select Carrier (or leave blank to select all):
☐ CMA-CGM
☐ Evergreen Line
☐ NYK Line Container in a Depot?
[ Both ▼ ]

Select States:
[ Select State ▼ ]

Enter a city name:
[                    ]

Provide Search Radius (Miles):
[ 0 ]

[ SEARCH ]  [ RESET FORM ]   ← 🖫 🗑 →

FIG. 5A

Basic Search

Arrival Date:
[                    ] 📅

Consigneed City within Iowa:
☐ 50855
☐ Ackley
☐ Ackworth
☐ Adair
☐ Adel
☐ Afton
☐ Agency
☐ Ainsworth If city is not listed please enter:
[                    ]

Advanced Search

[ SEARCH ]  [ RESET FORM ]

FIG. 5B

| CONSIGNEE CITY ▼ | CONSIGNEE STATE ◆ | CARRIER NAME ◆ | CARRIER CODE ◆ | CONTAINER SIZE ◆ | ARRIVAL DATE ◆ | PORT OF ARRIVAL ◆ | BILL OF LADING NUMBER ◆ | MASTER BILL OF LADING NUMBER ◆ | CONTAINER TYPE ◆ | CONTAINER NUMBE |
|---|---|---|---|---|---|---|---|---|---|---|
| AMES | IOWA, IA | DANMAR LINES LTD | DMAL | 40 | 04-21-17 | NEW YOUR/NEWARK AREA, NEWARK, NEW JERSEY | DMALBCN089389 | ZIMUBCN10022122 | Dry | Sh Conta Click |
| BETTENDORF | IOWA, IA | HAPAGLLOYD A G | HLCU | 20 | 04-21-17 | NEW YOUR/NEWARK AREA, NEWARK, NEW JERSEY | HLCUDUSHD00901AA | HLCUDUS170400901 | Dry | Sh Conta Click |
| CEDAR RAPIDS | IOWA, IA | VANTECT HTS FORWARDING LTD | VHFL | 45 | 04-21-17 | SEATTLE, WA | VHFLTSC7NGB00218 | APLU069853213 | Dry | Sh Conta Click |
| CEDAR RAPIDS | IOWA, IA | VANTECT HTS FORWARDING LTD | VHFL | 45 | 04-21-17 | SEATTLE, WA | VHFLTSC7NGB00217 | APLU069853213 | Dry | Sh Conta Click |
| CEDAR RAPIDS | IOWA, IA | GL CONTAINER LINE | GCNL | 20 | 04-21-17 | LOS ANGELES, CA | GCNLGCNLB1702158 | MAEU959442165 | Dry | Sh Conta Click |
| CEDAR RAPIDS | IOWA, IA | GL CONTAINER LINE | GCNL | 20 | 04-21-17 | LOS ANGELES, CA | GCNLGCNLB1702158 | MAEU959442165 | Dry | Sh Conta Click |

CARGO OPTIMIZATION SYSTEMS, DEVICES AND RELATED METHODS

CROSS-REFERENCE TO RELATED APPLICATION(S)

This application claims priority to U.S. Provisional Application No. 62/514,338 filed Jun. 2, 2017, which is hereby incorporated by reference in its entirety.

TECHNICAL FIELD

The embodiments disclosed herein relate to various systems for optimizing cargo loads and related methods and devices. Certain embodiments include various hardware and software systems constructed and arranged for matching and shipping containers and prospective cargo for transport.

BACKGROUND

In many shipping applications, freight containers are entering an area—such as a city or state—full and leaving empty. This marks a key market inefficiency and source of frustration for both shippers and shipping companies.

There is a need in the art for improved cargo placement methods, systems, and devices for cargo or freight optimization.

BRIEF SUMMARY OF THE INVENTION

Discussed herein are various systems, methods and devices for optimizing cargo freight loads in trips to and from various areas of the country. In certain implementations, a website is provided. In further implementations, the website pulls data from publicly available records kept in databases to allow users to match loads with cargo containers for shipping.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One Example includes a system for optimizing shipping container utilization, including a server in operational communication with at least one database and a #2970509 computer implementing a computer-readable media; and a processor in operational communication with the server and at least one database, the processor constructed and arranged for executing a computer program for implementing a cargo utilization platform, where the database is constructed and arranged to compile and index shipping container capacity data, the cargo utilization platform is constructed and arranged to access shipping container capacity data and identify at least one deadhead container, and the cargo utilization platform is constructed and arranged to pair at least one user with at least one identified deadhead container. Other embodiments of this aspect include corresponding computer systems, apparatus, and computer programs recorded on one or more computer storage devices, each configured to perform the actions of the methods.

Implementations may include one or more of the following features. The system where the database is an SQL database in operational communication with a server and a processor. The system where the shipping container capacity data is unused container data. The system where the shipping container capacity data further includes at least one of the group including of: consignee city, state, carrier name, carrier code, container size, arrival date, port of arrival, bill of lading number, master bill of lading number, container type and container number. The system where the shipping container capacity data is drawn from at least one of public cargo data and private cargo data. Implementations of the described techniques may include hardware, a method or process, or computer software on a computer-accessible medium.

Another Example includes a method for optimizing utilization of shipping containers in transit, including aggregating shipping container capacity data from at least one shipping container data source on a searchable database, identifying at least one deadhead container via the shipping container capacity data; and pairing at least one user with the at least one identified deadhead container via a platform in networked communication with the searchable database. Other embodiments of this aspect include corresponding computer systems, apparatus, and computer programs recorded on one or more computer storage devices, each configured to perform the actions of the methods.

Implementations may include one or more of the following features. The method where the searchable database is an SQL database in operational communication with a server and a processor. The method where the shipping container capacity data is unused container data. The method where the shipping container capacity data further includes at least one of the group including of: consignee city, state, carrier name, carrier code, container size, arrival date, port of arrival, bill of lading number, master bill of lading number, container type and container number. The method where aggregated shipping container capacity data is drawn from at least one of public cargo data and private cargo data. The method where the platform is constructed and arranged such that users can search for deadhead container routes. Implementations of the described techniques may include hardware, a method or process, or computer software on a computer-accessible medium.

Yet another Example includes a system for optimizing shipping container utilization, including at least one searchable database including shipping container capacity data, and a processor in operational communication with the at least one searchable database and at least one database, the processor constructed and arranged for executing a computer program for implementing a cargo utilization platform, where the platform is constructed and arranged to: aggregate shipping container capacity data from at least one shipping container data source on the at least one searchable database, identify at least one deadhead container via the shipping container capacity data, and pair at least one user with the at least one identified deadhead container via a platform in networked communication with the searchable database. Other embodiments of this aspect include corresponding computer systems, apparatus, and computer programs recorded on one or more computer storage devices, each configured to perform the actions of the methods.

Implementations may include one or more of the following features. The system where the at least one searchable database is an SQL database in operational communication with a server. The system where the shipping container capacity data is unused container data. The system where the shipping container capacity data further includes at least one of the group including of: consignee city, state, carrier name, carrier code, container size, arrival date, port of arrival, bill of lading number, master bill of lading number, container type and container number. The system where the shipping container capacity data is drawn from at least one of public cargo data and private cargo data. The system where the platform is constructed and arranged such that users can search for deadhead container routes. Implementations of the described techniques may include hardware, a method or process, or computer software on a computer-accessible medium.

Certain implementations therefore provide a process by which companies and other interested parties in a region to be able to see the shipping containers arriving into any particular region, where they are going, and when they will arrive. These implementations allow users to contact other third party carriers directly and negotiate terms by which they can use empty containers at a cheaper shipping rate, thus reducing deadheading freight.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 1B is a schematic showing used and deadhead shipping containers, and in FIG. 1B-3, how a deadhead container can be utilized, according to one implementation.

DETAILED DESCRIPTION

The various systems and devices disclosed herein relate to devices, systems and methods for shipping container or cargo optimization. Certain implementations of the disclosed devices, systems and methods relate to the collection and aggregation of information about the location, type, and availability of shipping containers and make those sources available for search and optimization. In exemplary implementations, the disclosed systems, devices and methods allow for optimization of cargo capacity in shipping routes by compiling capacity data about cargo containers, including deadheading routes, times, and the like, so as allow users to fill empty cargo containers.

In various exemplary embodiments, the disclosed systems, methods and devices allow for the aggregation and optimization of shipping container capacity data. That is, in one step according to exemplary implementations, excess cargo capacity—such as empty or "deadheading" shipping containers set to travel in transportation routes—is catalogued/aggregated via one or more databases. In another step, shipping container capacity data is made available for search to users in need of excess capacity—buyers and/or shippers to acquire and use. Further steps are also possible and contemplated herein. The various embodiments are disclosed in additional detail in the attached figures, which include some written description therein.

As is shown in these figures and will be appreciated by those of skill in the art, one important aspect of the disclosed system 10 that no one has created an online marketplace that does not displace or disrupt the current chain of shipping container utilization. Because the system does not place itself into the reservation process, it allows the typical users to continue to optimize the system, just with additional information at their disposal.

Figure 1A:
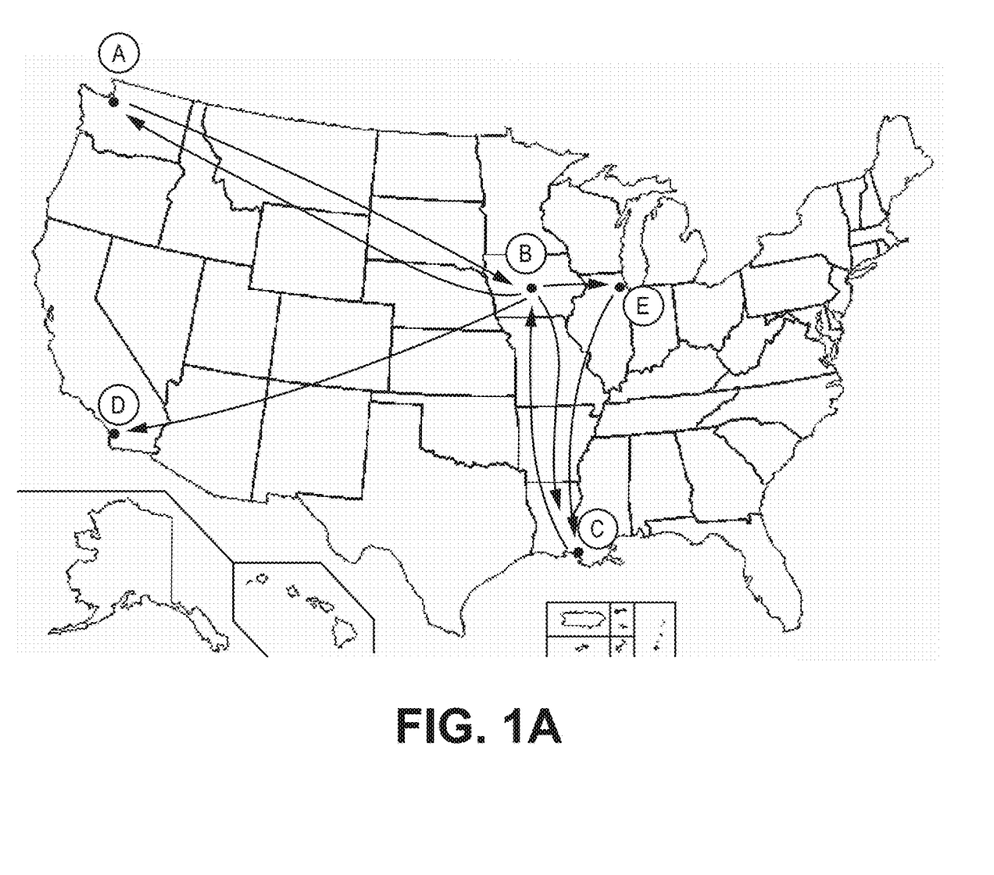
FIG. 1A is a schematic overview of example shipping container routes, illustrating how deadheading can occur.
Figure 1B:
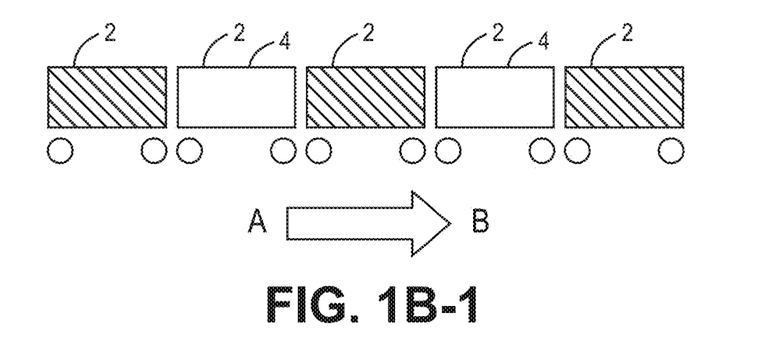
Figure 1B:
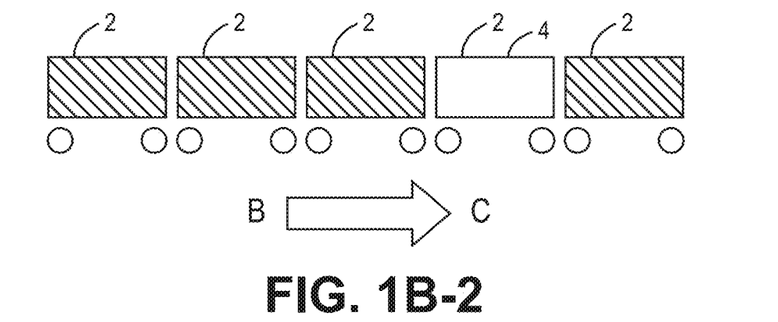
Figure 1B:
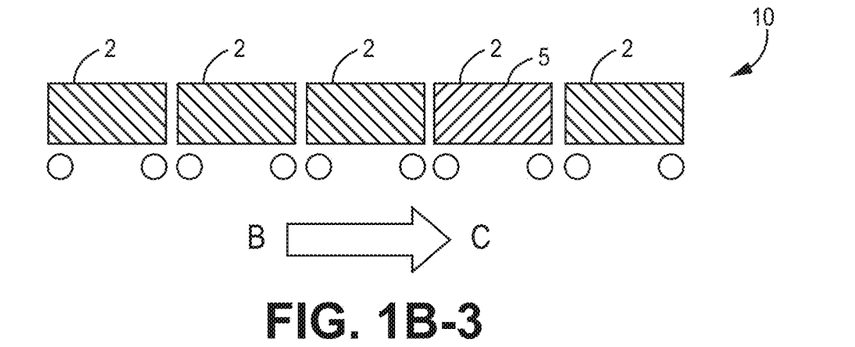

FIGS. 1A-1B shows an overview map of several possible shipping routes. In many cases, a cargo container coming from one point (designated by reference point A) will be dispatched to a destination (reference point B) full of cargo. However, in many of these circumstances, after arriving and being unloaded at the destination (point B), the cargo container may need to be transported to a third location (such as back to reference point A, or on to reference point C or D).

In many cases, these subsequent trips may be made with an empty cargo container. It is understood that excess, unused cargo capacity space is often called "deadheading," and it leads to inefficiencies well-understood in the art and described above, as well as the unnecessary use of energy sources such as fossil fuels, as well as hours of work time. Despite this known need, no solution had been presented in the art prior to the disclosed cargo optimization and transaction system 10.

FIG. 1B demonstrates the method disclosed herein, wherein shipping containers 2, such as those loaded on rail or in trucks, are moved from A to B, B to C or C to D, as is shown in FIGS. 1B-1 through 1B-3. In the prior art, and as shown in FIGS. 1B-1 and 1B-2, certain empty containers 4 are "deadheaded" from one point to another, as there has not been a way to broker a pairing of a user in need of any individual deadhead shipping container 4 for use by a third party.

However, as shown in FIG. 1B-3, in exemplary implementations of the cargo optimization system 10, an otherwise deadhead container can be filled with the cargo of a user, thus transforming the otherwise deadhead container into a utilized container 5.

While the disclosed embodiments and implementations may be referred to herein as such a system 10, this is in no way to be considered limiting: the associated methods and devices are also contemplated throughout. In various implementations, the system 10 performs a method comprising a plurality of steps. In various implementations, these steps can be performed in any order.

Figure 2:
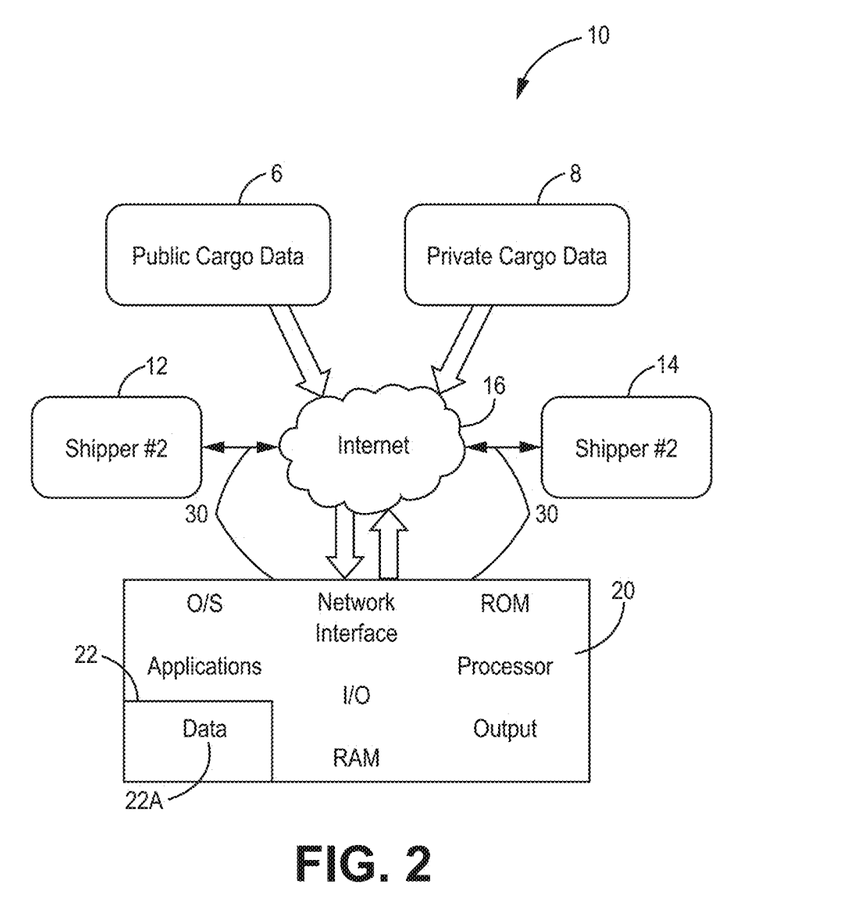
FIG. 2 is a schematic overview of an implementation of the networked cargo optimization system.
Figure 3:
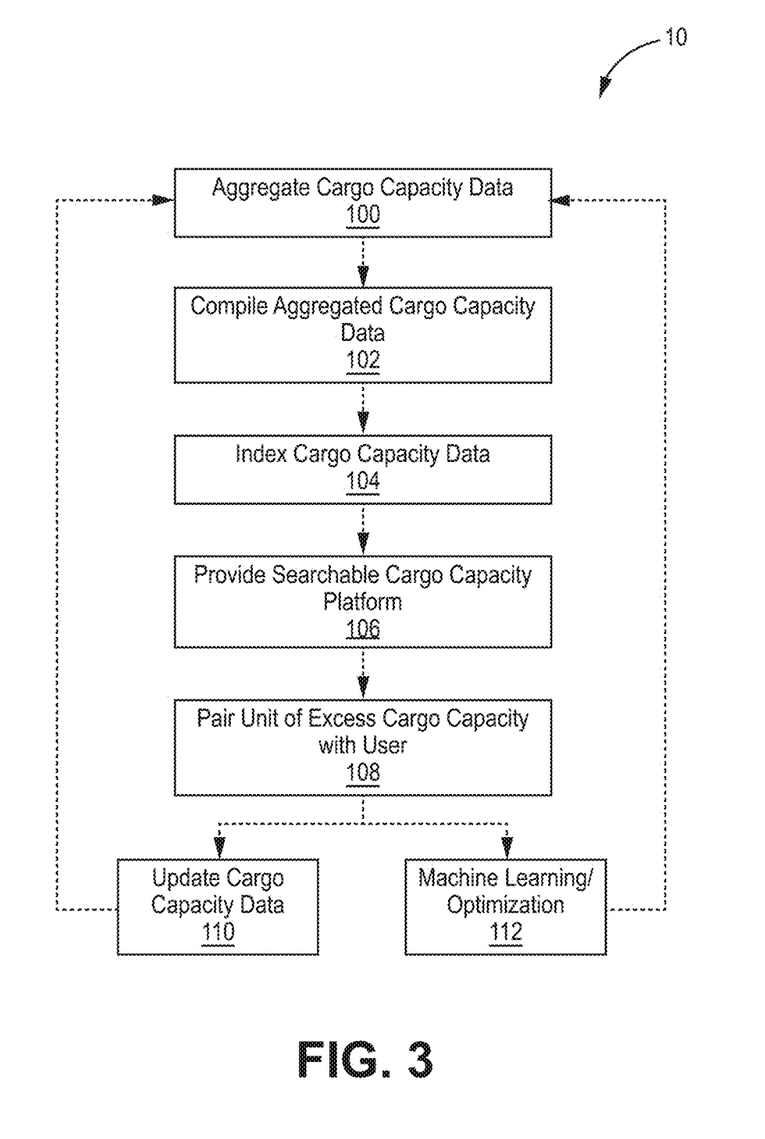
FIG. 3 is a flow chart showing the steps of one implementation of the cargo optimization system, according to an exemplary embodiment.

FIGS. 2 and 3 depict a schematic diagrams of a cargo optimization and transaction system 10, or cargo system 10, according to certain implementations. As is shown, the system's platform 30 according to these implementations uses aggregated shipping container capacity data to allow for the coordination of shipping container loading into arriving and (empty) departing shipping containers to reduce overall deadhead miles.

As is also shown in the implementation of FIG. 2, a shipper 12 and other shipper 14 are able to utilize an internet website or other platform 30 accessed via a network 16 to access a server 20 having at least one database 22 comprising shipping container capacity data 22A, as is described below.

In these implementations, the database 22 is accessible to shippers 12, 14 via a network 16, including via platform 30 which in various implementations can be a website interface such as a browser, digital device application, API or other known method for accessing an SQL or other database comprising computer-readable media.

According to these implementations, and as shown in FIG. 3 at box 100, in one step the cargo optimization system 10 aggregates shipping container capacity data 22A such as public shipping container data 6, private shipping container data 8 and/or other shipping container capacity data 22A into a database 22, including data entered by users 12, 14 via the network 16, server 20 and/or the database 22, as shown in FIG. 2.

Accordingly, in use according to certain implementations, in one step the system 10 aggregates shipping container capacity data (box 100), and specifically excess shipping container capacity data 22A, from any number of public 6 and/or private 8 sources, including ocean carrier databases, user entered data, and other users that have shipping containers available for use.

For example, in certain implementations, the database is populated from private 8 and/or public 6 records and/or by scraping or data mining a mix of public and private databases such as ocean carrier data and the US Customs and Border Protection database for shipping container capacity data 22A. Further, the database 22 can include any additional information known to be useful in transaction systems.

Figure 6:
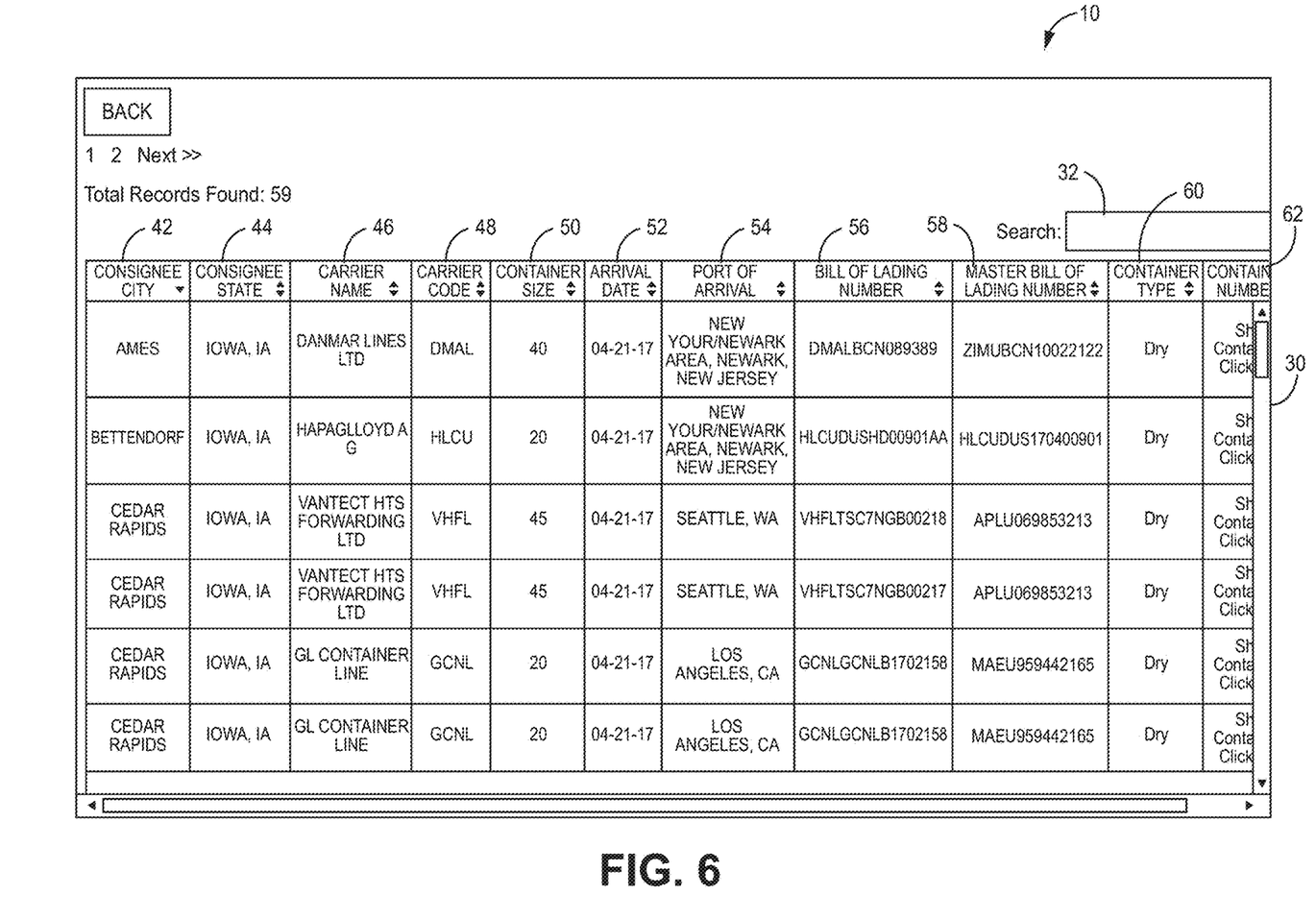
FIG. 6 is a table showing various pieces of cargo capacity data, according to one implementation.

This shipping container capacity data 22A can include any of the type of information or data discussed in relation to FIG. 6, some non-limiting examples including unused container 4 data, as well as the consignee city 42, state 44, the carrier name 46, the carrier code 48, the container size 50, the arrival date 52, the port of arrival 54, the bill of lading number 56, the master bill of lading number 58, the container type 60, container number 62, consignee address and container and/or shipment contents: wet/dry; full/empty/partially full.

As shown in FIG. 3 at boxes 102-104, in another step the shipping container capacity data 22A is thereby compiled (box 102) and indexed (box 104) on the database (shown in FIG. 2 at 22) for access by the platform 30. That is, in subsequent steps, the database 22 is then made searchable (box 106) for shipping container capacity data 22A in an additional step, as is shown generally in FIGS. 4-7.

Figure 4:
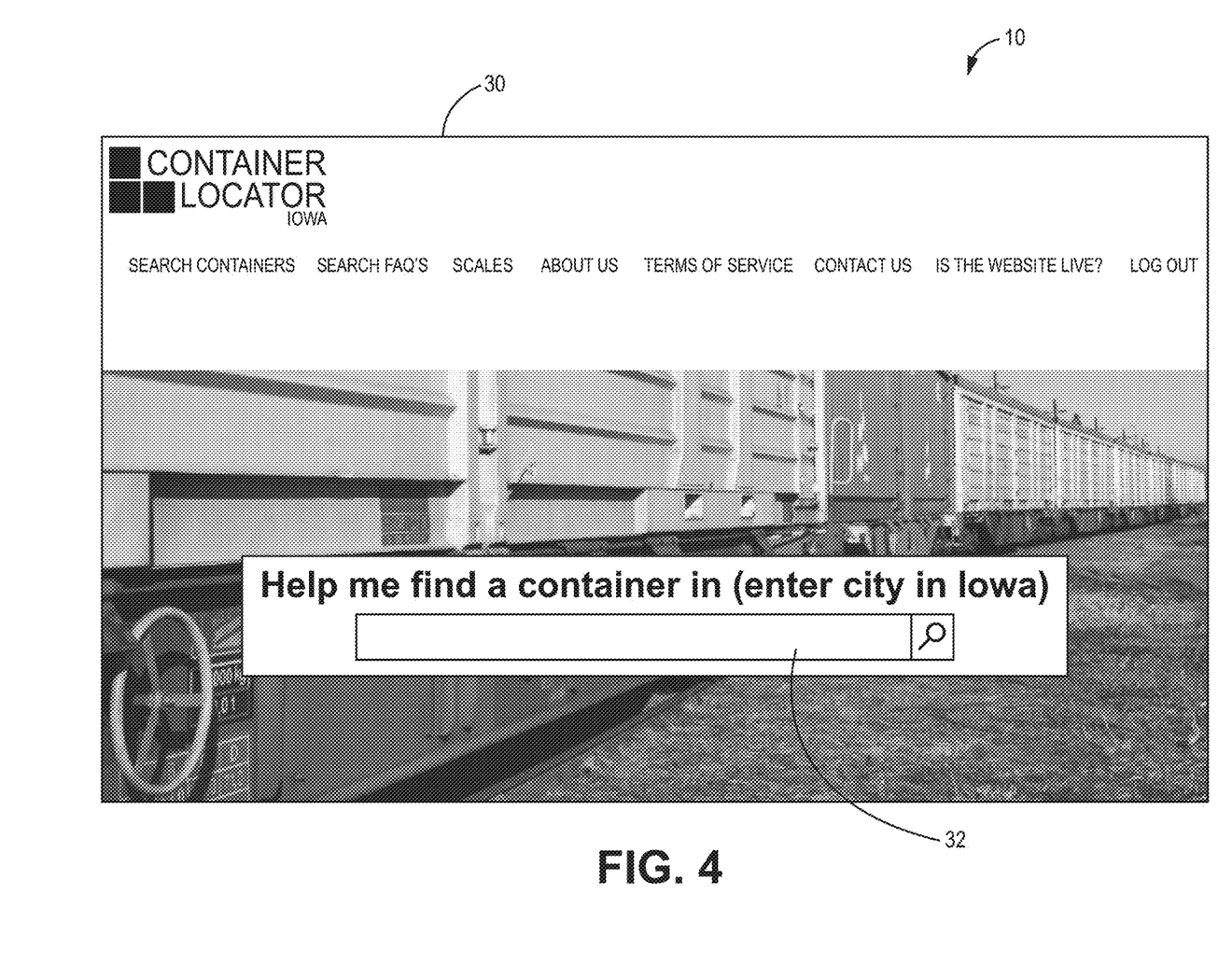
FIG. 4 is a screenshot showing the platform search function, according to one implementation.

The data 22 is rendered for query in a user-accessible platform (shown in FIG. 4 at 30). This frontend of the platform 30 can be a website which users will interact with, though other implementations such as APIs and other platforms may be used in various implementations. In each of these, the platform 30 will pull data from the database 22 for users to review.

Figure 5A:
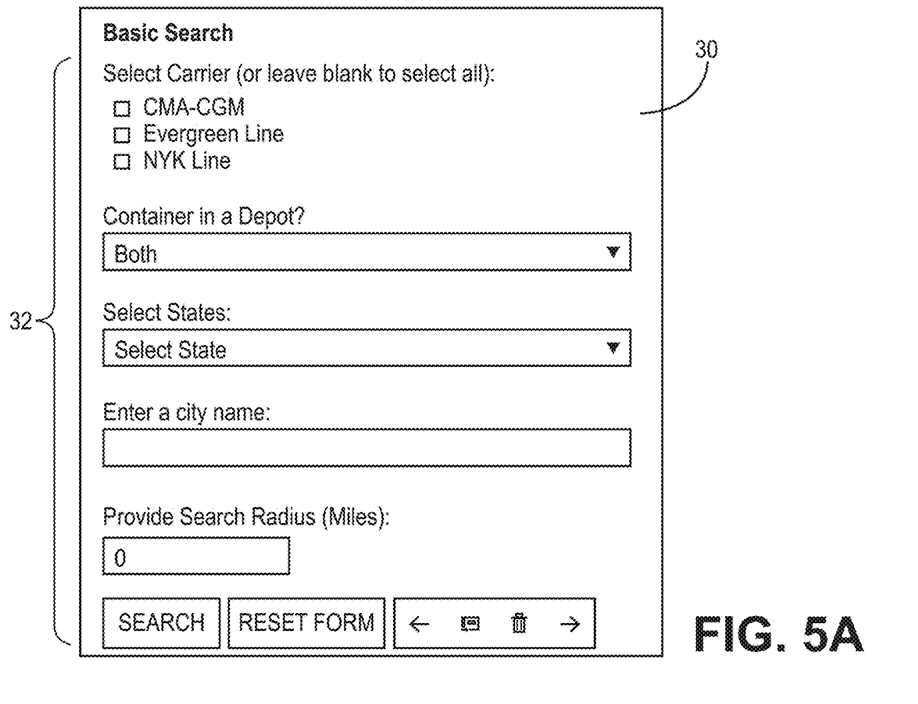
FIGS. 5A and 5B are screenshots showing advanced search capabilities, according to alternate implementations.
Figure 5B:
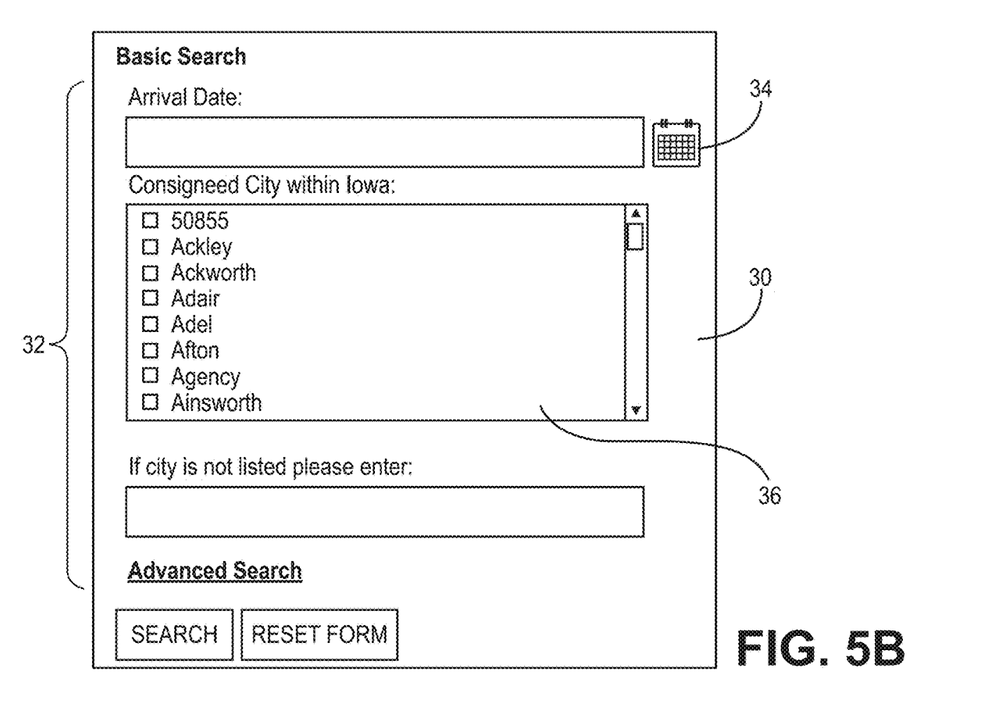

In the implementation of FIGS. 4-6, the users of the platform 30 searching for containers having specified parameters drawn from the shipping container capacity data 22A. It is understood that if a user 12, 14 finds a container matching certain specified criteria, the user 12, 14 is then able to secure the use of that container for the transport of cargo between points, which also prevents deadheading, as described in relation to FIG. 1.

Therefore, in use according to the implementations of FIGS. 2-3, the system 10 allows for the pairing (box 108) of a shipper 12—such as a shipper 12 having excess cargo capacity in a container—with another shipper 14—such as a shipper 14 in need of a shipping container—to be able to be paired via an online website.

Accordingly, in use the system 10 acts so as to match cargo containers in a certain area with cargos that may need to be shipped, as is described in further detail below. And as shown in the implementations of FIGS. 4-7, the system 10 provides the user with the ability to search 32 for any given container/route.

In the implementations of FIGS. 4-5, a user 12, 14 is able to access the platform 30 such as a website 30 having a search function 32, and is thereby able to search for relevant data 22 such as locations and/or dates.

In further implementations, menu options can be provided to the user to select or otherwise enter the date 34 and/or location 36, as is shown in FIG. 5. It is understood that in certain additional implementations, other factors such as whether it is a dry or wet cargo container can be searched.

For example, in certain implementations, a user may wish to move a dry load from Seattle to Des Moines within the month (shown at A-B in FIG. 1). It is understood that the user can then tailor their search to identify appropriate deadhead cargo containers traveling between Seattle and Des Moines within, for example 30 days. It is understood that other search locations and parameters are of course possible.

As shown in FIG. 6, after performing a search, certain implementations of the system 10 are able to populate search results (shown generally at 40). These search results can include shipping container capacity data about the individual container, some non-limiting examples including the consignee city 42, state 44, the carrier name 46, the carrier code 48, the container size 50, the arrival date 52, the port of arrival 54, the bill of lading number 56, the master bill of lading number 58, the container type 60 and container number 62, or any of the other data discussed in relation to FIG. 6.

Figure 7:
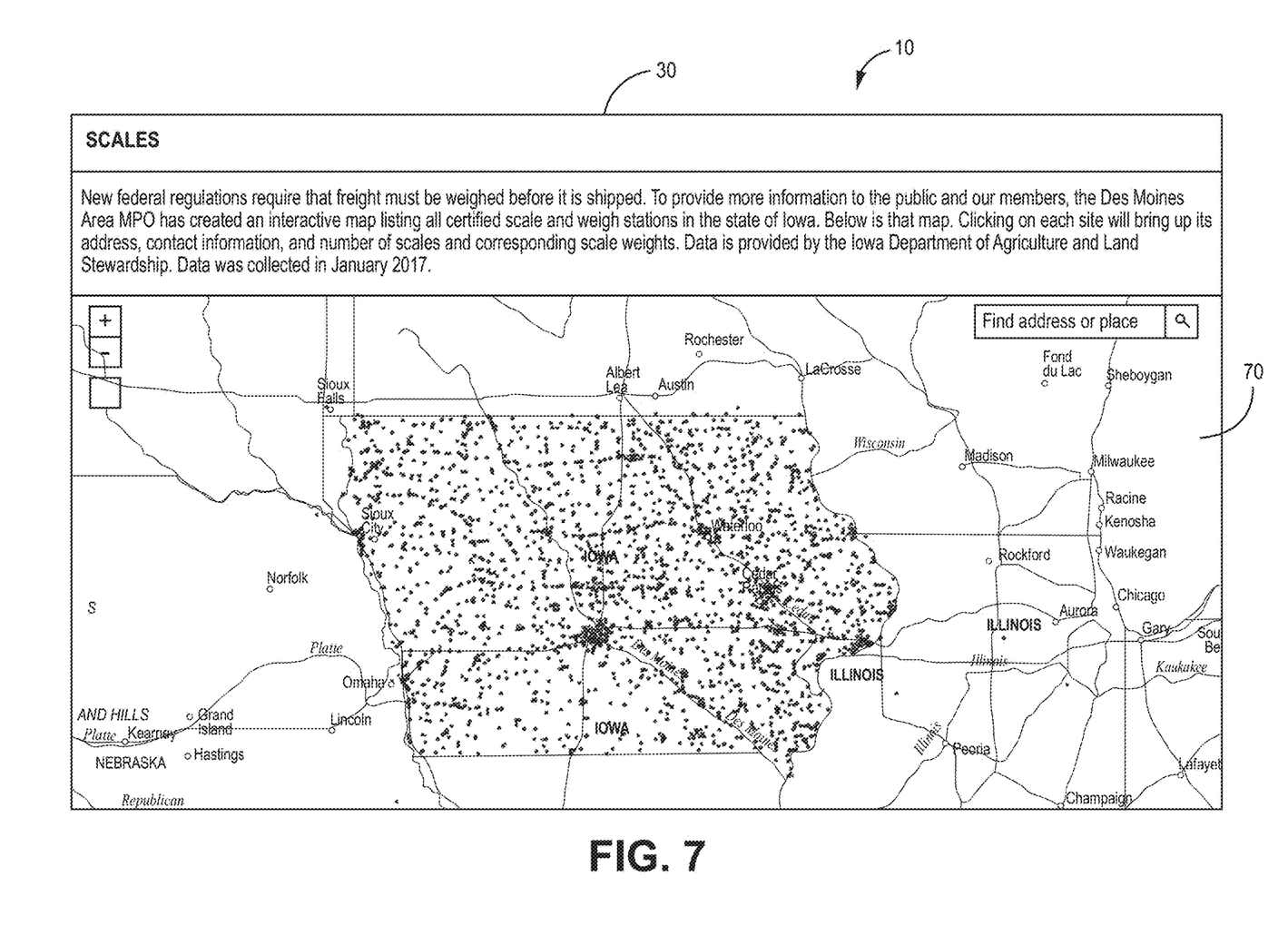
FIG. 7 is a map showing relevant information within the platform, according to one implementation.

It is understood that additional implementations may comprise further factors or data points. In certain additional implementations, various maps 70 such as weigh station or loading data can be provided, as is shown in FIG. 7.

In use, after a user is able to identify a container traveling in a desired direction for use, the user is able to contact the container operator and initiate the transaction, as would be understood by one of skill in the art. It is further understood that in alternate implementations, the system 10 can provide the parties with relevant information to facilitate the transaction.

It is further understood that a variety of methods can be used to pair shippers in securing the container for use (box 108). It is understood that in various implementations, a user 12 in need of a shipping container for a specified route can be matched with a container holder 14 needing to move an empty shipping container along the specified route to negotiate a rate to utilize the container in question with the entity that is in charge of that container at that time.

It is understood that this pairing (box 108) in certain implementations will involve contacting the responsible entity's representative, through e-mail or phone, and discuss or negotiate a cost to use the shipping container. Often times this is the ocean carrier that owns the shipping container. In further implementations, the platform 30 can execute one or more algorithms and/or machine learning techniques (as is shown generally in box 112) to facilitate the pairing of users and containers, as well as to update the platform and improve pairing (box 108).

Accordingly, the shipping container capacity data 22A is used by the system 10 in subsequent aspects and/or steps to optimize efficiency, allow the private sale of excess cargo capacity and prevent deadheading. It is understood that the data 22 can consist of any number of relevant data points, several examples of which are described in relation to FIGS. 4-7. Additionally, the database 22 can be updated in real time (box 110) and those updates aggregated into the shipping container capacity data 22A.

It is further understood that in order to use the site, people may need to register and create a login ID and password. It is further understood that in certain implementations, transaction data will be collected and used by the system.

It is understood that, according to one implementation, the network 16 is the Internet. Alternatively, the network 16 can be any local area network ("LAN") or any other known type of network. Accordingly, various implementations of the system and method employ the use of computer hardware, software and/or firmware, including associated computer-readable media.

It is understood generally that in various implementations of the cargo system 10, one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

It is understood that the server (also referred to herein as a "processor" or "central processor") 20 can be any computer or processor known to those skilled in the art. In one embodiment, the central processor 20 includes a website hosted in at least one or more computer servers. It is understood that any cargo matching system disclosed herein may have one or more such server 20 and that each server may any type of known server, processor, or computer, any of which can run on a variety of platforms.

The processor 20 has a central processing unit ("CPU") and main memory, an input/output interface for communicating with various databases, files, programs, and networks (such as the Internet, for example), and one or more storage devices. The storage devices may be disk drive devices, CD-ROM devices, or the cloud. The processor 20 may also have an interface, including, for example, a monitor or other screen device and an input device, such as a keyboard, a mouse, a touchpad, or any other such known input device.

In one embodiment, the processor 20 includes software programs or instructions that run on the server-side to process communications with the shipper 12 and other shipper 14. The database 22, according to one embodiment, serves as the input to and information storage for the transaction system 10. For example, the database 22 contains user information relating to users of the transaction system 10 that can be saved and/or accessed by the processor 20, such as the shipping container data discussed below.

The database 22 can be an SQL database 22 or of any type generally known in the art. That is, the database 22 can be integral to the processor 20 or accessible to the processor 20 through a computer network or other suitable communication link. In one embodiment, the database 22 is comprised of a plurality of database servers, some or all of which can be integral to the central processor 20 or alternatively can be physically separate from the processor 20.

Although the disclosure has been described with reference to preferred embodiments, persons skilled in the art will recognize that changes may be made in form and detail without departing from the spirit and scope of the invention.

What is claimed is:

1. A system for optimizing shipping container utilization, comprising:
   a. a server in operational communication with at least one database and a computer implementing a computer-readable media; and
   b. a processor in operational communication with the server and at least one database, the processor constructed and arranged for executing a computer program for implementing a cargo utilization platform,
   wherein:
   a. the database is constructed and arranged to compile and index shipping container capacity data, and
   b. the cargo utilization platform is constructed and arranged to:
      (i) automatically access and extract the shipping container capacity data from at least one of a public cargo database and a private cargo database,
      (ii) populate the database with the shipping container capacity data, the shipping container capacity data comprising unused container data,
      (iii) identify one or more deadhead container routes based on the unused container data and one or more parameters of a prospective cargo, each deadhead container route comprising a route along which a deadhead container with unused cargo capacity is scheduled to travel, and
      (iv) facilitate transport of the prospective cargo in a deadhead container scheduled to travel along a selected one of the one or more deadhead container routes, thereby reducing deadheading time along the selected deadhead container route,
   wherein the cargo utilization platform is further constructed and arranged to execute one or more machine learning techniques when pairing deadhead container routes and prospective cargos.

2. The system of claim 1, wherein the database is an SQL database in operational communication with a server and a processor.

3. The system of claim 1, wherein the shipping container capacity data further comprises at least one of the group consisting of: consignee city, state, carrier name, carrier code, container size, arrival date, port of arrival, bill of lading number, master bill of lading number, container type and container number.

4. A method for optimizing utilization of shipping containers in transit, comprising:
   a. aggregating shipping container capacity data from at least one shipping container data source on a searchable database, the aggregating comprising:
      (i) automatically accessing and extracting shipping container capacity data from at least one of a public cargo database and a private cargo database, the shipping container capacity data comprising unused container data, and
      (ii) populating the searchable database with the shipping container capacity data, the searchable database constructed and arranged to compile and index the shipping container capacity data;
   b. receiving one or more parameters of a prospective cargo;
   c. identifying one or more deadhead container routes based on the unused container data and the one or more parameters, each deadhead container route comprising a route along which a deadhead container with unused cargo capacity is scheduled to travel;

d. facilitating transport of the prospective cargo in a deadhead container scheduled to travel along a selected one of the one or more deadhead container routes, thereby reducing deadheading time along the selected deadhead container route, and g. executing one or more machine learning techniques when pairing deadhead container routes and prospective cargos.

5. The method of claim 4, wherein the searchable database is an SQL database in operational communication with a server and a processor.

6. The method of claim 5, wherein the shipping container capacity data further comprises at least one of the group consisting of: consignee city, state, carrier name, carrier code, container size, arrival date, port of arrival, bill of lading number, master bill of lading number, container type and container number.

7. A system for optimizing shipping container utilization, comprising:

a. at least one searchable database comprising shipping container capacity data, the shipping container capacity data comprising unused container data; and b. a processor in operational communication with the at least one searchable database and with at least one of a public cargo database and a private cargo database, the processor constructed and arranged for executing a computer program for implementing a cargo utilization platform, wherein the platform is constructed and arranged to:

i. automatically access and extract the shipping container capacity data from at least one of a public cargo database and a private cargo database and aggregate the shipping container capacity data on the at least one searchable database;

ii. receive one or more prospective parameters a prospective cargo;

iii. identify one or more deadhead container routes based on the unused container data and the one or more parameters, each deadhead container route comprising a route along which a deadhead container with unused cargo capacity is scheduled to travel; and iv. facilitate transport of the prospective cargo in a deadhead container scheduled to travel along a selected one of the one or more deadhead container routes, thereby reducing deadheading time along the selected deadhead container route;

c. wherein the platform is further constructed and arranged to execute one or more machine learning techniques when pairing deadhead container routes and prospective cargos.

8. The system of claim 7, wherein the at least one searchable database is an SQL database in operational communication with a server.

9. The system of claim 7, wherein the shipping container capacity data further comprises at least one of the group consisting of: consignee city, state, carrier name, carrier code, container size, arrival date, port of arrival, bill of lading number, master bill of lading number, container type and container number.

\* \* \* \* \*